United States Patent
Defaix et al.

(10) Patent No.: US 9,525,368 B2
(45) Date of Patent: Dec. 20, 2016

(54) SYSTEM FOR CONTROLLING A SYNCHRONOUS ELECTRIC MOTOR

(71) Applicant: Schneider Toshiba Inverter Europe SAS, Pacy sur Eure (FR)

(72) Inventors: Olivier Defaix, Versailles (FR); Thomas Devos, Carrieres sous Poissy (FR)

(73) Assignee: SCHNEIDER TOSHIBA INVERTER EUROPE SAS, Pacy sur Eure (FR)

( * ) Notice: Subject to any disclaimer, the term of this patent is extended or adjusted under 35 U.S.C. 154(b) by 85 days.

(21) Appl. No.: 14/395,827

(22) PCT Filed: Jun. 6, 2013

(86) PCT No.: PCT/EP2013/061703
§ 371 (c)(1),
(2) Date: Oct. 21, 2014

(87) PCT Pub. No.: WO2013/186115
PCT Pub. Date: Dec. 19, 2013

(65) Prior Publication Data
US 2015/0084574 A1     Mar. 26, 2015

(30) Foreign Application Priority Data
Jun. 13, 2012   (FR) .................... 12 55537

(51) Int. Cl.
*H02P 1/46* (2006.01)
*H02P 6/08* (2016.01)

(52) U.S. Cl.
CPC ........... *H02P 6/08* (2013.01); *H02P 21/24* (2016.02)

(58) Field of Classification Search
CPC .................... H04W 84/042; H04W 12/06
USPC ............... 318/731, 400.12, 432, 721
See application file for complete search history.

(56) References Cited

U.S. PATENT DOCUMENTS

| 5,670,854 A * | 9/1997 | Matsuura | B62D 5/046 318/432 |
| 2007/0236167 A1* | 10/2007 | Tomigashi | H02P 6/18 318/721 |
| 2008/0007199 A1* | 1/2008 | Kasaoka | H02P 21/0089 318/807 |
| 2010/0072929 A1 | 3/2010 | Tomigashi | |

(Continued)

OTHER PUBLICATIONS

International Search Report issued May 9, 2014, in PCT/EP2013/061703, filed Jun. 6, 2013.

*Primary Examiner* — Paul Ip
*Assistant Examiner* — Devon Joseph
(74) *Attorney, Agent, or Firm* — Oblon, McClelland, Maier & Neustadt, L.L.P.

(57) ABSTRACT

A control system included in a speed selector connected by output phases to a synchronous electric motor, the synchronous electric motor being controlled according to a control law implemented by the speed selector. A first speed of the synchronous electric motor is determined by a first speed estimator. A second speed estimator is used to determine a second speed of the synchronous electric motor. The system includes a signal generator module configured to apply, to the output phases, voltages taking account of a non-constant current signal. The second speed estimator is configured to recover the current response on the output phases, to deduce therefrom the second speed of the synchronous electric motor.

8 Claims, 3 Drawing Sheets

(56) References Cited

U.S. PATENT DOCUMENTS

2012/0161688 A1\* 6/2012 Tamai ...................... H02P 1/52
318/721

\* cited by examiner

SYSTEM FOR CONTROLLING A SYNCHRONOUS ELECTRIC MOTOR

TECHNICAL FIELD OF THE INVENTION

The present invention pertains to a control system implemented in a variable speed drive connected to a synchronous electric motor.

PRIOR ART

In a synchronous electric motor, with zero torque, the current at the stator of the motor is zero but the motor can continue to rotate and therefore have a non-zero speed. Within a context of functional safety, it is known to monitor the speed of an electric motor by executing two different, independent algorithms in redundancy mode. When the synchronous electric motor rotates whilst the current at the stator is zero, the estimation of the speed of the motor with an algorithm based on the current at the stator may therefore turn out to be difficult.

Techniques with high-frequency injections make it possible to estimate the angle of the motor and therefore its rotation speed. Such is the case in patent application US2007/0236167A1. One of the drawbacks of this scheme is the necessity for sufficient decoupling of the time scales (the injection must be fast with respect to the rotation frequency). It is also necessary that current ripples be sufficient to disregard the nonlinear effects of the current sensors (quantization for example).

The aim of the invention is to propose a control system implemented in a variable speed drive making it possible to estimate the speed of a synchronous electric motor, even when the torque is zero, without any knowledge about the parameters of the motor, nor any high-frequency injection.

ACCOUNT OF THE INVENTION

This aim is achieved by a control system included in a variable speed drive connected by output phases to a synchronous electric motor, said synchronous electric motor being controlled according to a control law implemented by the variable speed drive, a first speed of the synchronous electric motor being determined by a first speed estimator, said system comprising a second speed estimator making it possible to determine a second speed of the synchronous electric motor and a signal-generating module devised so as to generate a non-constant signal in terms of estimation current which gets added to the reference flux current so as to create a corrected reference flux current which is applied as input to the control law, said control law being executed to determine the voltages to be applied to the output phases, the second estimator being devised so as to recover the response in terms of current on the output phases, with a view to deducing therefrom the second speed of the synchronous electric motor.

Preferably, the signal in terms of current is of low-frequency sinusoidal type with respect to the frequency of the electric motor. The frequency of the injected signal must be less than the frequency of the motor, for example by a ratio of ten.

Preferably, the signal in terms of current is non-torque-generating.

According to a particular feature, the system comprises a safety block devised so as to compare the first speed and the second speed that are determined for the synchronous electric motor.

According to another particular feature, the first speed estimator is devised in a control law implemented by the control system.

According to the invention, the signal-generating module is activated by the second estimator, by an external control or is permanently active.

BRIEF DESCRIPTION OF THE FIGURES

Other characteristics and advantages will become apparent in the detailed description which follows given with regard to the appended drawings in which.

DETAILED DESCRIPTION OF AT LEAST ONE EMBODIMENT

Figure 1:
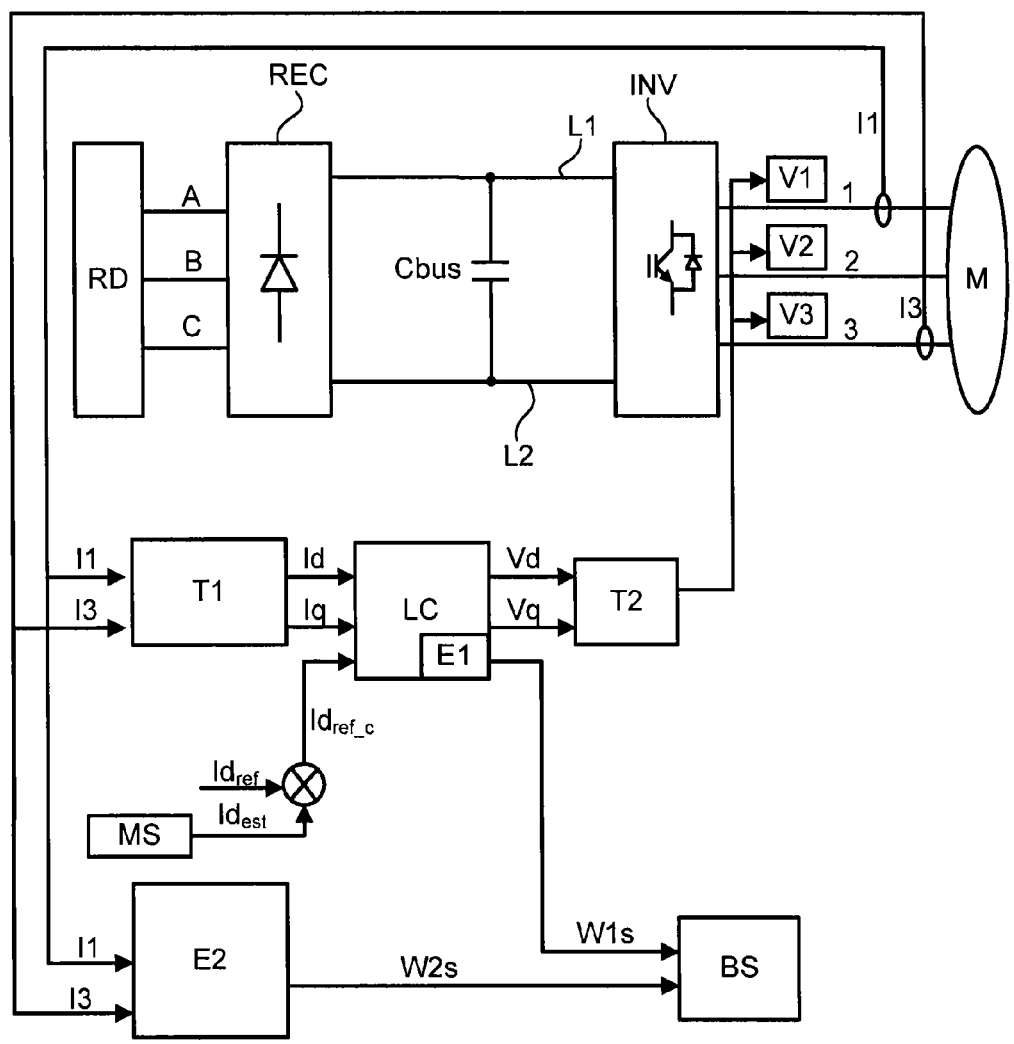
FIG. 1 represents the control system of the invention.

The invention relates to a control system implemented in a variable speed drive for the control of a synchronous electric motor.

In a known manner, a variable speed drive comprises:
three input phases A, B, C connected to an electrical distribution network RD,
a rectifier module REC situated at input and intended to convert an AC voltage provided by the electrical distribution network RD into a DC voltage,
a DC power supply bus connected, upstream, to the rectifier module REC and, downstream, to the inverter module INV and comprising two power supply lines L1, L2 between which the DC voltage is applied,
a bus capacitor Cbus connected to the two power supply lines L1, L2 and charged with maintaining the DC voltage of the bus at a constant value,
an inverter module INV connected by three output phases 1, 2, 3 to the synchronous electric motor M and controlled by control signals generated by a control unit implementing a determined control law LC. The inverter module INV of a variable speed drive comprises several switching arms, for example three in number if the motor M is three-phase. Each switching arm comprises two power transistors, for example of IGBT type, each controlled by a control device receiving control signals from the control unit.

The invention applies to a variable speed drive operating according to an open-loop control law. It exhibits a very particular benefit within a framework of functional safety.

In open loop, a first estimator executed by the control unit makes it possible to determine a first estimated speed W1s of the synchronous electric motor M. To estimate the speed of the synchronous electric motor, this first speed estimator E1 is based for example on the control law LC or on measurements of voltage on the output phases 1, 2, 3 if such data are available.

Within a context of functional safety, a second estimator E2 is necessary so as to determine a second estimated speed W2s of the synchronous electric motor. The control system comprises a safety block BS making it possible to compare the second estimated speed W2s and the first estimated speed W1s. If divergences appear between the two estimated speeds, the safety block BS will be required for example to halt the synchronous electric motor M.

Within the field of functional safety, with a view to avoiding any common point of failure, the two estimators E1, E2 are different, in their operating principle and in their realization.

The monitoring of the speed by the two estimators E1, E2 in redundancy mode has various objectives, provided for in a known standard (for example IEC61800-5-2), such as for example safe limitation of the speed (SLS "Safe Limited Speed") or safe stopping (SS1 "Safe Stop 1").

In a synchronous electric motor M, the current at the stator is zero when the torque is zero. However, in this situation, the motor M can nevertheless be rotating and therefore have a non-zero speed. The estimation of the speed of the synchronous electric motor at zero torque cannot therefore be carried out based on the current at the stator.

According to the invention, when the torque is zero, the second speed estimator E2 makes it possible to estimate the speed of the synchronous electric motor whilst the current at the stator is zero. The system is devised so as to apply, on the output phases 1, 2, 3, voltages V1, V2, V3 representative of a signal in terms of current, called the signal in terms of estimation current $Id_{est}$, which is non-torque-generating, and to measure the response in terms of current on the output phases, with a view to deducing therefrom a speed of the synchronous electric motor.

This signal in terms of estimation current $Id_{est}$ is applied in the direction of the permanent flux of the magnet of the synchronous electric motor M, that is to say along the axis d of the control, called the flux axis. The application of a current in the direction of the flux of the magnet makes it possible not to create disturbances in the motor M when it is running.

According to the invention, the signal in terms of estimation current $Id_{est}$ is non-constant, preferably sinusoidal. Non-constant signal is understood to mean a signal whose derivative is not zero over a determined duration. It will thus be independent of the control law, of the parameters of the synchronous electric motor M and of the voltage limitation. Indeed, as a function of the control law LC, the average value of the flux current is not necessarily equal to the real flux current. It is therefore possible to have a zero current in the output phases even if the setpoint is non-zero and constant. A non-constant signal makes it possible to circumvent this problem and to guarantee a non-zero real signal (except at a few points) which makes it possible to estimate the speed of the motor.

Furthermore, the signal in terms of estimation current $Id_{est}$ is preferably non-torque-generating. Non-torque-generating signal in terms of current is understood to mean a signal having a sufficiently slow frequency as not to create torque disturbance.

Its amplitude can be fixed, for example chosen as a function of the nominal current of the synchronous electric motor, or variable, taking account of the currents measured on the output phases.

With reference to FIG. 1, the signal in terms of estimation current $Id_{est}$ arises from a signal-generating module MS. The signal-generating module MS generates the signal in terms of estimation current $Id_{est}$ which gets added to the reference flux current $Id_{ref}$, normally applied as input to the control law LC. The corrected reference flux current $Id_{ref\_c}$ which is applied as input to the control law LC is therefore representative of the above-mentioned signal in terms of estimation current $Id_{est}$. In a known manner, on the basis of the corrected reference flux current $Id_{ref\_c}$ and measurements of the flux current Id and torque current Iq (which are obtained after transformations T1), the control law LC determines the voltages to be applied to the output phases 1, 2, 3, for example via Concordia and Park transformations T2. The voltages V1, V2, V3 calculated are thus applied to the output phases by PWM (Pulse Width Modulation) control of the inverter module INV.

The second speed estimator E2 recovers the measurement of at least two currents I1, I3 injected on the three phases of the motor M and then determines, solely on the basis of these measurements, the second estimated speed W2s of the synchronous electric motor M (without using motor data). The determination of the second speed is carried out by employing a phase locked loop (PLL).

As described hereinabove, the first estimated speed W1s of the electric motor arises for example directly from the control law LC. The safety block BS thereafter compares the first estimated speed W1s and the second estimated speed W2s. If divergences appear, the safety block BS can be required to halt the motor, for example by disabling the inverter module.

The injection of the signal in terms of estimation current $Id_{est}$ allows the second speed estimator E2 to preserve a second estimation of the speed whilst the torque is zero and therefore to implement principles of functional safety over the whole of the operating span of the synchronous electric motor M.

The signal-generating module MS can be active permanently or activated only when the torque is zero and therefore when the current at the stator is zero. It will be able for example to be activated by the second estimator E2 or by an external control. When the torque is not zero and a current at the stator is detectable, the generation of the signal in terms of current $Id_{est}$ is in fact not necessary since it is possible to estimate the speed of the synchronous electric motor M on the basis of the current at the stator.

FIGS. 2A, 2B, 3A and 3B illustrate the benefit of the invention.

Figure 2A:
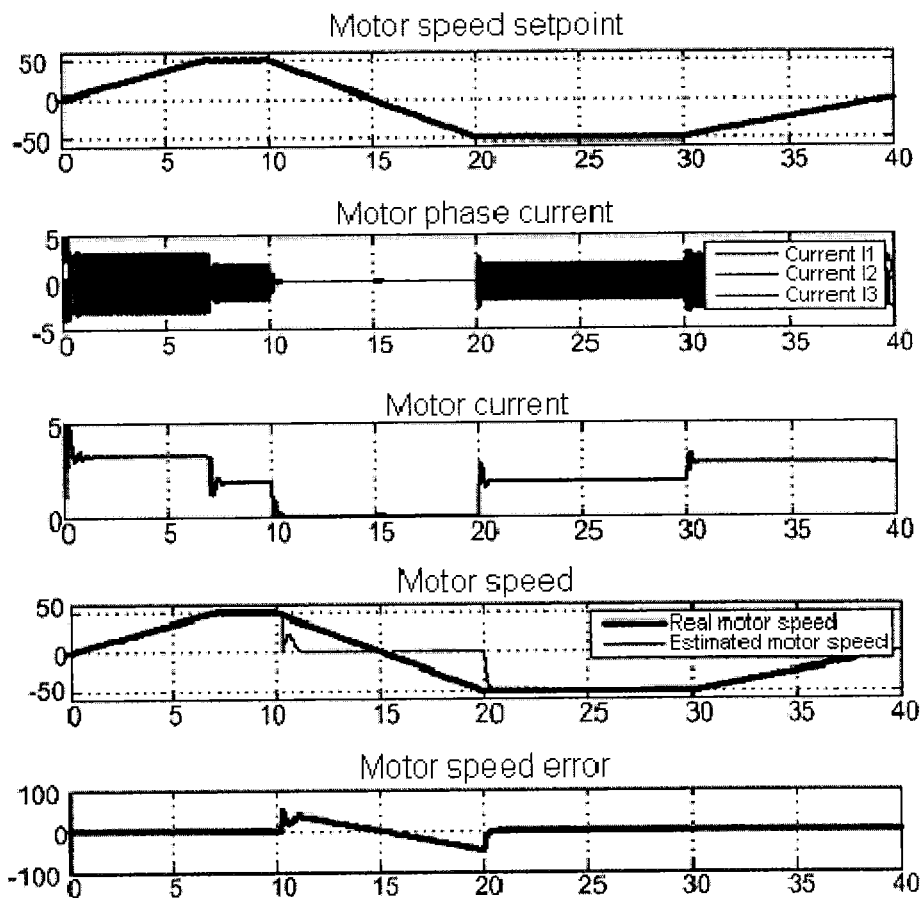
FIGS. 2A and 2B represent simulation curves established without the control system of the invention.
Figure 2B:
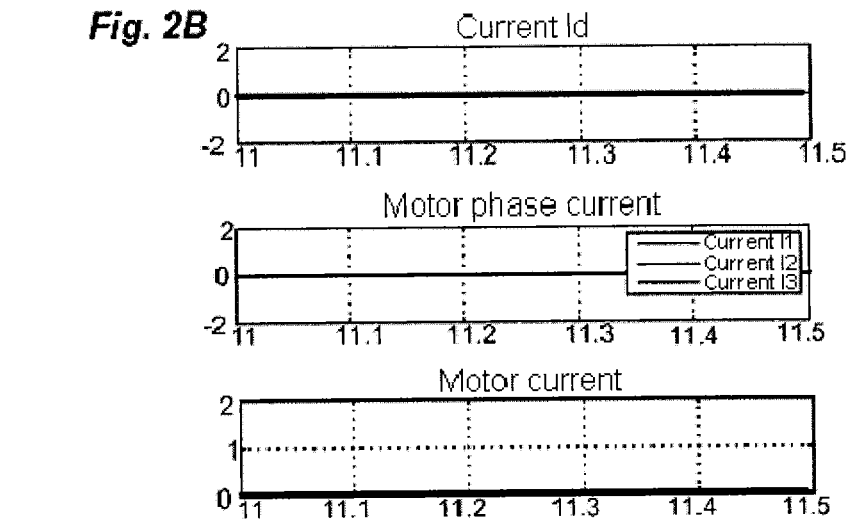

In FIGS. 2A and 2B, the second estimator of the invention is not implemented. It may be seen that between the tenth and the twentieth second, the motor current is zero. The estimated speed of the motor is then considered to be zero whilst the real speed of the motor is not. The error in the speed of the motor is therefore significant and incompatible with principles of functional safety.

Figure 3A:
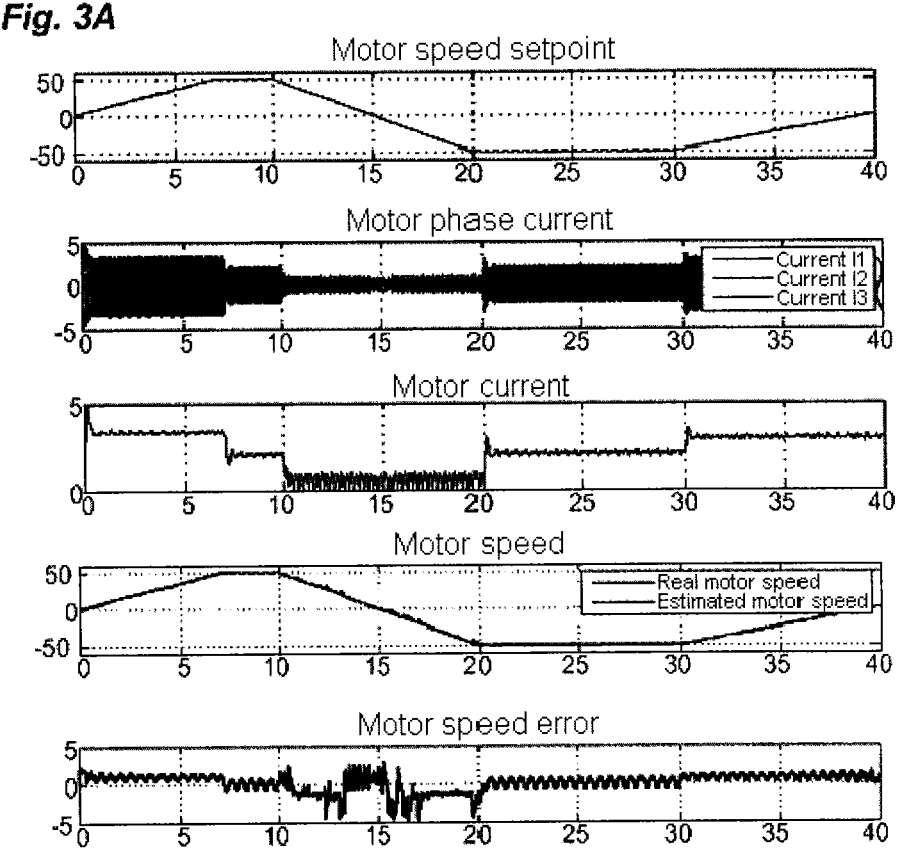
FIGS. 3A and 3B represent simulation curves established with the control system of the invention.
Figure 3B:
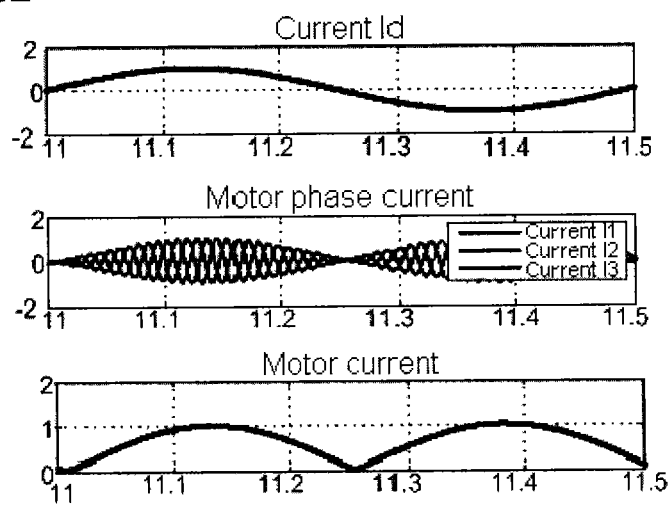

In FIGS. 3A and 3B, the second estimator of the invention is implemented. A sinusoidal flux current Id is therefore applied and the currents I1, I2 and I3 are therefore observable on the output phases. A motor current, not generating any torque, is therefore visible. The curve of estimated speed of the motor is close to the curve of real speed of the motor, making it possible to minimize the error in the speed and therefore to guarantee a certain safety level.

The invention claimed is:

1. A control system included in a variable speed drive connected by output phases to a synchronous electric motor, the synchronous electric motor being controlled by a controller of the variable speed drive, a first speed of the synchronous electric motor being determined by a first speed estimator, the control system comprising:
   a second speed estimator configured to determine a second speed of the synchronous electric motor; and
   a signal generator configured to generate a non-constant signal n terms of estimation current, the non-constant signal being added to a reference flux current to create a corrected reference flux current, the corrected reference flux current being applied as an input to the controller and the signal generator being activated when a torque of the synchronous electric motor is zero, wherein the controller is configured to determine voltages to be applied to the output phases, and the second estimator is configured to
- recover a response in terms of current on the output phases,
- deduce the second speed of the synchronous electric motor from the response, and
- determine an actual speed of the synchronous electric motor when the torque is zero and a current at a stator of the synchronous electric motor is zero.

2. The system as claimed in claim 1, wherein the signal in terms of current is of low-frequency sinusoidal type with respect to the frequency of the motor.

3. The system as claimed in claim 1, wherein the signal in terms of current is non-torque-generating.

4. The control system as claimed in claim 1, further comprising a safety block configured to compare the first speed and the second speed that are determined for the synchronous electric motor.

5. The control system as claimed in claim 1, wherein the first speed estimator is configured in the controller implemented by the control system.

6. The control system as claimed in claim 1, wherein the signal generator is activated by the second estimator.

7. The control system as claimed in claim 1, wherein the signal generator is activated by an external control.

8. The control system as claimed in claim 1, wherein the signal generator is permanently active.

* * * * *